L. Miller.
Mower.
No. 769 Reissued Jul. 9. 1859.
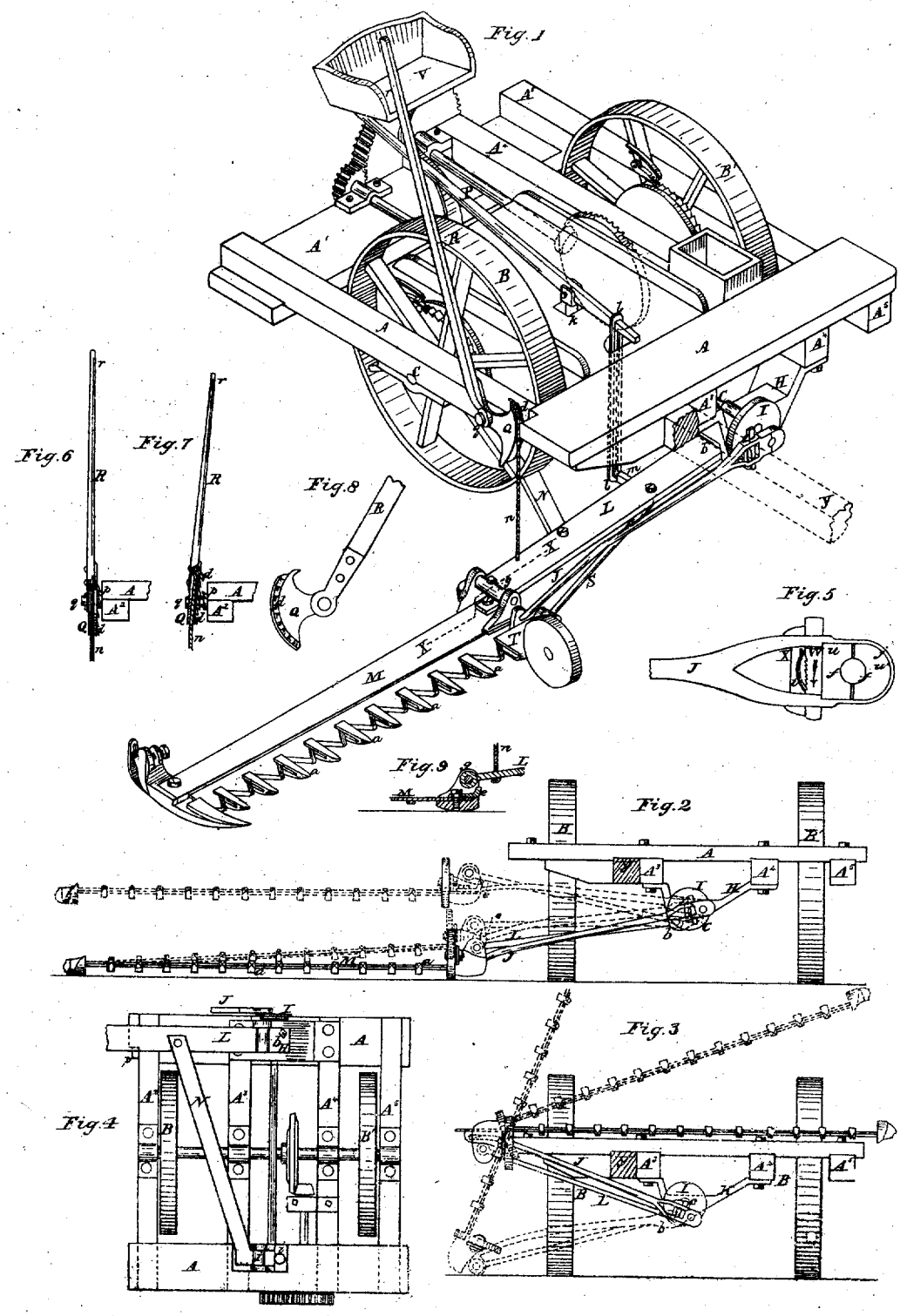

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 769, dated July 19, 1859.

DIVISION F.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface with its left end raised to conform thereto, and the blue lines showing the finger-beam raised off and held parallel to the ground by means of a hand-lever to pass over an obstacle. Fig. 3 represents by the black lines a front elevation of the machine with the finger-beam folded over upon the frame in a compact manner. The red lines show the finger-beam raised on one end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents on an enlarged scale a view of one side of a portion of the connecting-rod which transmits motion from the crank to the cutter. Fig. 6 represents a front view of the quadrant-lever for lifting and the ratchet-teeth and detent for holding up the finger-beam when raised; also, a fragment of the adjacent part of the frame detached from the machine. Fig. 7 represents a similar view of the same parts, the quadrant lever and its ratchet-teeth being in the position they occupy when turned aside to disengage the teeth from the detent preparatory to raising or lowering the finger-beam; and Fig. 8 represents a view of the side of the quadrant having the ratchet-teeth thereon. Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1 I call the "right" side; the other I call the "left" side.

When the finger-beam of a mowing-machine is connected to the main frame by means of a yielding coupling-arm, it is important that the weight of the coupling-arm and of other parts bearing upon that end of the finger-beam should be counterpoised in order to allow the end of the finger-beam next the arm to rise freely to accommodate itself to the unequal surface of the ground. This object has heretofore been attained in various ways, all of which are liable to objections, which it is one object of the invention herein claimed to avoid, and which invention consists in applying a counterpoise to the coupling-bar, so that it must act upon the finger-beam through the coupling-bar, which being wholly outside of the swath being cut, the means employed for counterpoising cannot increase the liability of the machine to become entangled or clogged with the falling grass, as it is liable to do to a greater or less extent in all machines in which a counterpoise is applied to or acts directly upon the finger-beam behind the cutters and within the range of the swath. It is important while counterpoising the coupling-arm to do it in such manner as to facilitate the raising of the finger-beam at the will of the driver of the machine to pass over a stone or other obstruction; and this invention further consists in so arranging a lever to act as a counterpoise to the coupling-arm that it will be within convenient reach of the feet of the driver, that he may, whether sitting or standing, even in an emergency, when both his hands are otherwise occupied, bear with one of his feet upon this lever, and thereby raise the finger-beam promptly to the height acquired to pass over an obstruction, and where, as in this case, a hand-lever is also used for raising the coupling-arm and finger-beam, a youth or other person too feeble to raise them by hand alone may with ease do so by the aid of his foot applied to the foot-lever.

The accompanying drawings represent a mowing-machine supported on an axle, C, and a pair of wheels, B and B′, and drawn by a tongue, Y, projecting in front of the wheels and having a frame, A A′ $A^2$ $A^3$ $A^4$ $A^5$, to carry the gearings, which transmit motion from the supporting-wheels to the cutter, and the necessary means for connecting the finger-beam to the frame through a yielding coupling-arm.

A lever, P, is supported on a fulcrum-pin near its front end, which pin passes through a standard, K, supported on the beam $A^3$ of the frame. A link, *l*, connects the front end of the lever with a pin, *m*, projecting from the rear side of the coupling-arm L, about one-third of its length from its left end. The lever P is so arranged as to extend backward from its fulcrum *k* beneath the seat V of the driver, and but little elevated above the level at which the driver would ordinarily place his feet, so that he may without inconvenience sit or stand with one of his feet upon the lever always ready to bear down upon it, and if driving unruly horses or in different places, where both his hands and his eyes are fully occupied with other duties, he could readily raise tne finger-beam by simply depressing his foot, so easily is it lifted when counterpoised in this manner; or, in case a youth was driving whose muscular strength was unequal to raising the finger-beam by one hand or by the pressure of his foot alone, by pulling the hand-lever R backward with his hand at the same time that he pressed his foot upon the lever P he might easily raise the finger-beam by his weight and muscular force combined and applied in this manner.

What I claim under this patent as my invention is—

The arrangement of the hand-lever R, dsiver's seat V, and foot-lever P, whereby the driver may, when necessary, employ both his hands and his feet to raise the finger-beam, substantially as set forth.

In testimony whereof I have hereunto subscribed my name.

LEWIS MILLER.

Witnesses:
S. HAWKES,
JAS. S. TONNER.